US004001553B2

United States Statutory Invention Registration [19]

[11] Reg. Number: H1553

Pedersen [45] Published: Jul. 2, 1996

[54] CLEAN DIESEL FUEL AND METHODS OF PRODUCING CLEAN DIESEL FUEL

[76] Inventor: Michael J. Pedersen, 33 Colonial, Irvine, Calif. 92720

[21] Appl. No.: 312,022

[22] Filed: Sep. 26, 1994

Related U.S. Application Data

[62] Division of Ser. No. 169,914, Dec. 20, 1993.

[51] Int. Cl.[6] ..... C10L 7/00

[52] U.S. Cl. ..... 44/268; 208/46

[58] Field of Search ..... 208/46; 44/268

[56] References Cited

U.S. PATENT DOCUMENTS 5,023,221 6/1991 Occelli ..... 502/66

*Primary Examiner*—Donald P. Walsh
*Assistant Examiner*—Anthony R. Chi

[57] ABSTRACT

A low emissions "clean" diesel fuel and methods of producing a clean diesel fuel are provided. In one aspect, this invention relates to a method of producing a diesel fuel which provides reduced, or at least substantially equivalent, emissions of oxides of nitrogen ("$NO_x$") In another aspect this invention relates to a clean diesel fuel composition which is economical to produce, meets regulatory specifications, and has desirable characteristics including acceptable aromatics content and cetane number.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLEAN DIESEL FUEL AND METHODS OF PRODUCING CLEAN DIESEL FUEL

This is a division, of application Ser. No. 08/169,914, filed Dec. 20, 1993.

BACKGROUND OF THE INVENTION

1. Field of the Invention

This invention relates to a clean diesel fuel and methods of producing a clean diesel fuel. In one aspect, this invention relates to a method of producing a diesel fuel which provides reduced emissions of oxides of nitrogen ("$NO_x$") and particulate matter. In all other aspect, this invention relates to a clean diesel fuel composition which is economical to produce, meets regulatory specifications, and has desirable characteristics including acceptable aromatics content and cetane number.

2. Description of the Related Art

Federal and state legislative bodies and agencies have issued a number of rules applicable to the production of clean diesel as an attempt to reduce emissions from heavy-duty vehicles of $NO_x$, carbon monoxide, unburned hydrocarbons, and particulate matter. Diesel fuel properties given the most attention are cetane number, aromatics content, and sulfur content. Federal regulations, for instance, require vehicular diesel fuel sold beginning Oct. 1, 1993 to have a maximum sulfur content of 0.05 percent and a minimum cetane index of 40 or a maximum aromatics content of 35 percent.

Some states have issued more demanding requirements. For example, the California Air Resources Board ("CARB") has adopted Section 2282, Title 13, California Code of Regulations ("Section 2282") which limits the aromatic hydrocarbon content of diesel fuel sold or intended for sale as a motor vehicle fuel in California starting Oct. 1, 1993.

Section 2282 establishes a basic California statewide aromatic hydrocarbon limit for vehicular diesel fuel of 10 percent by volume with a less stringent 20 percent standard for small refiners and a temporary 20 percent standard for independent refiners.

Sections 2282(*a*)(1)(C) and 2282(*g*) allow diesel fuel producers and importers to comply with the regulation with a set of diesel fuel specifications of their choosing if they can demonstrate the alternative specifications result in emission benefits equivalent to the emission benefits resulting from the 10 percent aromatic hydrocarbon standard (or, in the case of small refiners, the 20 percent aromatic hydrocarbon standard).

Section 2282(*g*) identifies a test procedure for comparative testing of a prototype ("candidate") fuel and a reference fuel representative of a diesel fuel with 10 percent aromatic hydrocarbons (or 20 percent by volume for small refiners) involving back-to-back tests using a specified heavy-duty diesel engine and identifies the statistical methodology to be used in comparing the emissions of $NO_x$, particulate matter, and the soluble organic fraction of the particulate matter resulting from the two fuels, and establishes a process for certifying diesel fuel formulations that satisfy the regulatory criteria.

Section 2282(*g*)(1) requires that an applicant for certification submit to the Executive Officer of CARB for approval a proposed test protocol which includes detailed information on the entity proposed to conduct the tests, the test procedures, analytical test data on the candidate and reference fuels, the quality control and quality assurance procedures, and identification of any statistical outlier tests to be used. The same section also provides procedures for applicants to submit a certification application which includes the approved test protocol, all of the test data, a copy of the complete test log, and a demonstration that the candidate fuel meets the requirements for certification.

If the Executive Officer of CARB finds that the candidate fuel has been properly tested and meets the performance criteria, an Executive Order certifying the diesel fuel formulation will be issued which assigns an identification name to the specific certified diesel fuel. The Order must specify that the certified diesel fuel formulation has the following specifications: (1) a sulfur content, total aromatic hydrocarbon content, polycyclic aromatic hydrocarbon content, and nitrogen content not exceeding that of the candidate fuel; (2) a cetane number not less than that of the candidate fuel; and (3) presence of all additives that were contained in the candidate fuel in a concentration not less than in the candidate fuel, except for an additive demonstrated by the applicant to have the sole effect of increasing cetane number.

The lower aromatics content, of ten percent (10%) or less, requirement is believed to have been established by CARB as an attempt to seek to reduce, even beyond the scope of Federal requirements, diesel engine $NO_x$ emissions and particulate matter emissions. Certain public reports issued by CARB have reflected CARB's apparent opinion, believed to have been expressed near the time of issuance of the California clean diesel regulatory requirements, that diesel powered heavy-duty vehicles contribute over 50 percent of the $NO_x$ emissions and over 84 percent of the particulate matter emissions from all motor vehicles in California.

Currently, many refiners produce diesel having an aromatics content in excess of 35 percent. Reducing the aromatics content of diesel from 35 percent or more to 10 percent or below requires significant capital investments for such refiners for new processing units, or process unit modifications, to reduce aromatics levels by extraction or by conversion to other compounds. In addition, each refiner's latitude to produce reformulated diesel varies with refinery configuration and the number of, and capacity of, process units and related process flexibility available in each refinery. Alternatively, certain refiners may have to buy diesel with 10 percent or less aromatics at relatively high prices to blend with their high aromatics refinery diesel products to meet regulated highway diesel aromatics specifications. Such purchases could adversely affect the economics of diesel production for a number of refiners.

In response to these CARB regulations, many California refiners and diesel importers need an economical and competitive diesel formula and method to produce diesel. To be competitive, this formula needs to contain more than 10 percent aromatics and a competitive cetane number, but must be certified by CARB.

For example, one published report, SAE Technical Paper 930728 authored by Manuch Nikanjam and entitled "Development of the First CARB Certified California Alternative Diesel Fuel", stated that a diesel fuel formulation was prepared for certification purposes, which had an aromatics level of 22.5 volume percent, and a cetane number of 53.4. Nikanjam reported that this formula, when tested, failed the $NO_x$ equivalency requirements although meeting the particulate matter and soluble organic fraction requirements, and thus would fail to obtain CARB certification.

Nikanjam stated that his "experience suggested aromatics would have to be at or below the 20% level" to meet CARB standards for diesel. Nikanjam concluded that "[s]uccessful certification of a 19% aromatics, 59 cetane number fuel and a 15% aromatics, 55 cetane number fuel will give a refinery the much needed flexibility of producing either a higher aromatics/higher cetane number fuel or a lower aromatics/lower cetane fuel."

Nikanjam's paper sets forth a predictive model for $NO_x$ as a function of cetane number and aromatics, as follows: $NO_x$ (g/bhp-h)=5.296–(0.0161)(Cetane)+(0.0281)(Aromatics)

Applying this model to a 20% aromatics diesel fuel, a cetane level of about 65 would be required for certification. Many refiners face formidable problems and high capital and production costs in achieving the relatively high cetane and low aromatics levels described by Nikanjam and required by his predictive formula to meet mandated $NO_x$ levels.

There is thus a need for alternative diesel fuels and a more economical process to produce diesel fuels which meet regulatory requirements.

SUMMARY OF THE INVENTION

I have discovered a simple and economical method to produce a clean diesel fuel which meets current regulatory emissions requirements, including meeting the stringent requirements for certification by CARB for sale in California.

In addition, contrary to the teachings of Nikanjam and others, I have found that I can produce a clean diesel fuel having an aromatics content well above 20 percent which can meet Federal and California emissions requirements.

Furthermore, I have discovered a method to produce a clean diesel fuel of this invention in a cost effective manner by one-pass hydrocracking. I have also discovered a method to modify an existing multi-stage hydrocracker to produce clean diesel without extraordinary capital investments. I have found that I can select feed materials as a feed for a once-through hydrocracking unit, employing preferred catalyst, to make clean diesel fuel.

One embodiment of this invention is a catalytic hydrocracking process which comprises (a) contacting a feed comprising diesel range materials boiling in the range of about 400° F. to about 710° F. and further comprising organo-nitrogen compounds, in a hydrotreating zone with added hydrogen, in the presence of hydrotreating catalyst effective to convert at least a portion of said organo-nitrogen compounds to hydrocarbons and ammonia, at elevated temperature and pressure, sufficient to form a hydrotreating zone effluent; (b) contacting the hydrotreating zone effluent in a hydrocracking zone with added hydrogen in the presence of hydrocracking catalyst, which is selective for gasoline range materials, at elevated temperature and pressure, sufficient to convert at least a portion of the hydrotreating zone effluent to form a hydrocracking zone effluent comprising a gasoline range fraction and a diesel range fraction; and, (c) fractionating the hydrocracking zone effluent to recover the diesel range fraction as fractionator bottoms and clean diesel product. In one variation of this embodiment, the hydrotreating zone is maintained at a pressure in the range of about 1,450 psig to about 2,100 psig and at a temperature in the range of about 550° F. to about 700° F. In another variation of this embodiment, the hydrocracking zone is maintained at a pressure in the range of about 1,400 to about 2,050 psig and at a temperature in the range of about 680° F. to about 780° F. Preferably, the added hydrogen to the hydrotreating zone is such that the ratio of hydrogen to hydrocarbon feed to the hydrotreating zone is in the range of about 5 to about 15 moles hydrogen per mole feed, and more preferably, the liquid hourly space velocity in the hydrotreating zone is in the range of about 1 to about 3.5 [$hr^{-1}$]. Preferably, the added hydrogen to the hydrocracking zone is add such that the ratio of hydrogen to feed of hydrotreating zone effluent to the hydrocracking zone is in the range of about 8 to about 25 moles hydrogen per mole feed, and more preferably, the liquid hourly space velocity in the hydrocracking zone is in the range of about 1 to about 3 [$hr^{-1}$]. It is preferred that the hydrocracking zone effluent be depressurized to a pressure in the range of about 0 psia to about 300 psia before fractionating the hydrocracking zone effluent.

In one preferred variation of this embodiment of this invention, the diesel range materials fed to the hydrotreating zone consist essentially of straight run diesel having 95% point per ASTM D2887-89 of about 710° F., and more preferably such materials have a 5% point per ASTM D2887-89 of about 400° F. In another preferred variation of this embodiment of this invention, the diesel range materials fed to the hydrotreating zone consist essentially of catalytic cracker cycle oil boiling primarily in the range from about 430° F. to about 680° F. (5% and 95% points, respectively, per ASTM D2887-89) and straight run diesel having 95% point per ASTM D2887-89 of about 710° F. In one variation, fluid catalytic cracker cycle oil is present in the feed in an amount ranging from about 0 volume percent to about 50 volume percent of the total feed, and in another variation, straight run diesel is present in the feed in an amount ranging from about 35 volume percent to about 90 volume percent, up to about 100 volume percent, of the total feed.

In another preferred variation of this embodiment of this invention, the diesel range materials fed to the hydrotreating zone consist essentially of catalytic cracker cycle oil boiling primarily in the range from about 430° F. to about 680° F., straight run diesel primarily in the range of about 400° F. to about 710° F., and coker diesel boiling primarily in the range from about 440° F. to about 710° F. (5% and 95% points, respectively, per ASTM D2887-89). In one variation, the feed comprises in the range of about 0 volume percent to about 20 volume percent coker diesel boiling primarily in the range from about 440° F. to about 710° F. In another variation, in addition to the coker diesel, the feed comprises in the range of about 0 volume percent to about 50 volume percent catalytic cracker cycle oil boiling primarily in the range from about 430° F. to about 680° F. and remainder of the feed being straight run diesel having 95% point per ASTM D2887-89 of about 710° F. In another preferred variation, in addition to the coker diesel, the feed comprises in the range of about 35 volume percent to about 90 volume percent, up to about 100 volume percent, straight run diesel having 95% point per ASTM D2887-89 of about 710° F.

In another embodiment of this invention, in a once-through hydrocracking process wherein a feed is contacted with added hydrogen, in the presence of hydrotreating catalyst at elevated temperature and pressure in a hydrotreater to produce a hydrotreater effluent and the hydrotreater effluent is contacted with added hydrogen, in presence of hydrocracking catalyst at elevated temperature and pressure in a hydrocracker to produce hydrocrackate, and a fractionator is employed to separate a product fraction from other fractions, an improvement comprises (a) hydrotreating a feed consisting essentially of diesel range material to form a hydrotreater effluent; (b) hydrocracking the hydrotreater effluent in the presence of a hydrocracking catalyst selective for gasoline range materials to form a hydrocrackate; and, (c) fractionating the hydrocrackate to produce a diesel fuel which is recovered as fractionator bottoms.

In another embodiment of this invention, a diesel fuel, having reduced, or at least substantially equivalent, emissions of oxides of nitrogen as compared to a reference fuel containing 10% by volume aromatics prepared in accordance with Title 13, California Code of Regulations effective at Oct. 1, 1993, is provided which is characterized by (a) a cetane number (per ASTM D-613-84) not less than 55.2; and, (b) total aromatics (per ASTM D-1319-84) not less than 21 percent by weight nor greater than 21.7 percent by weight. In one variation of this embodiment, the diesel fuel is further characterized by (a) polycyclic aromatics (per ASTM D-2424-83) not greater than about 4.6 percent by weight; (b) sulfur content (per ASTM D-2622-82) not greater than about 33 parts per million by weight; and, (c) nitrogen content (per ASTM D-4629-86) not greater than about 20 parts per million by weight.

In another embodiment of this invention, a diesel fuel, having reduced, or at least substantially equivalent, emissions of oxides of nitrogen as compared to a reference fuel containing 10% by volume aromatics prepared in accordance with Title 13, California Code of Regulations effective at Oct. 1, 1993, is provided which is characterized by (a) a cetane number (per ASTM D-613-84) not less than 56.2; and, (b) total aromatics (per ASTM D-1319-84) not less than 21 percent by weight nor greater than 24.7 percent by weight. In one variation of this embodiment, the diesel fuel is further characterized by (a) polycyclic aromatics (per ASTM D-2424-83) not greater than about 4.0 percent by weight; (b) sulfur content (per ASTM D-2622-82) not greater than about 42 parts per million by weight; and, (c) nitrogen content (per ASTM D-4629-86) not greater than about 40 parts per million by weight.

In another fuel embodiment, a diesel, having reduced, or at least substantially equivalent, emissions of oxides of nitrogen as compared to a reference fuel containing 10% by volume aromatics prepared in accordance with Title 13, California Code of Regulations effective at Oct. 1, 1993, is provided by blending two or more fuels of this invention. Preferably such blend is characterized by (a) a cetane number (per ASTM D-613-84) not less than about 55.2; (b) total aromatics (per ASTM D-1319-84) not less than 21 percent and not greater than about 24.7 percent by weight; (c) polycyclic aromatics (per ASTM D-2424-83) not greater than about 4.6 percent by weight; (d) sulfur content (per ASTM D-2622-82) not greater than about 42 parts per million by weight; and, (e) nitrogen content (per ASTM D-4629-86) not greater than about 40 parts per million by weight.

In still another embodiment of this invention, a method of reconfiguring a two stage hydrocracking process unit which comprises, in series, two hydrotreating reactors followed by, in series, two hydrocracking reactors to form two once-through hydrocracking units, comprises (a) combining one of the two hydrotreating reactors with one of the two hydrocracking reactors; and, (b) combining the other of the two hydrotreating reactors with the other of the two hydrocracking reactors.

These and other objects and advantages, details, features, and embodiments of this invention will become apparent to those skilled in the art from the following detailed description of the invention, the drawings, and the appended claims.

BRIEF DESCRIPTION OF THE DRAWINGS

In the accompanying drawings.

DESCRIPTION OF THE PREFERRED EMBODIMENTS

The invention is illustrated with reference to the drawings, for purposes of illustration of preferred embodiments, it being understood that this invention is not limited thereto.

Figure 1:
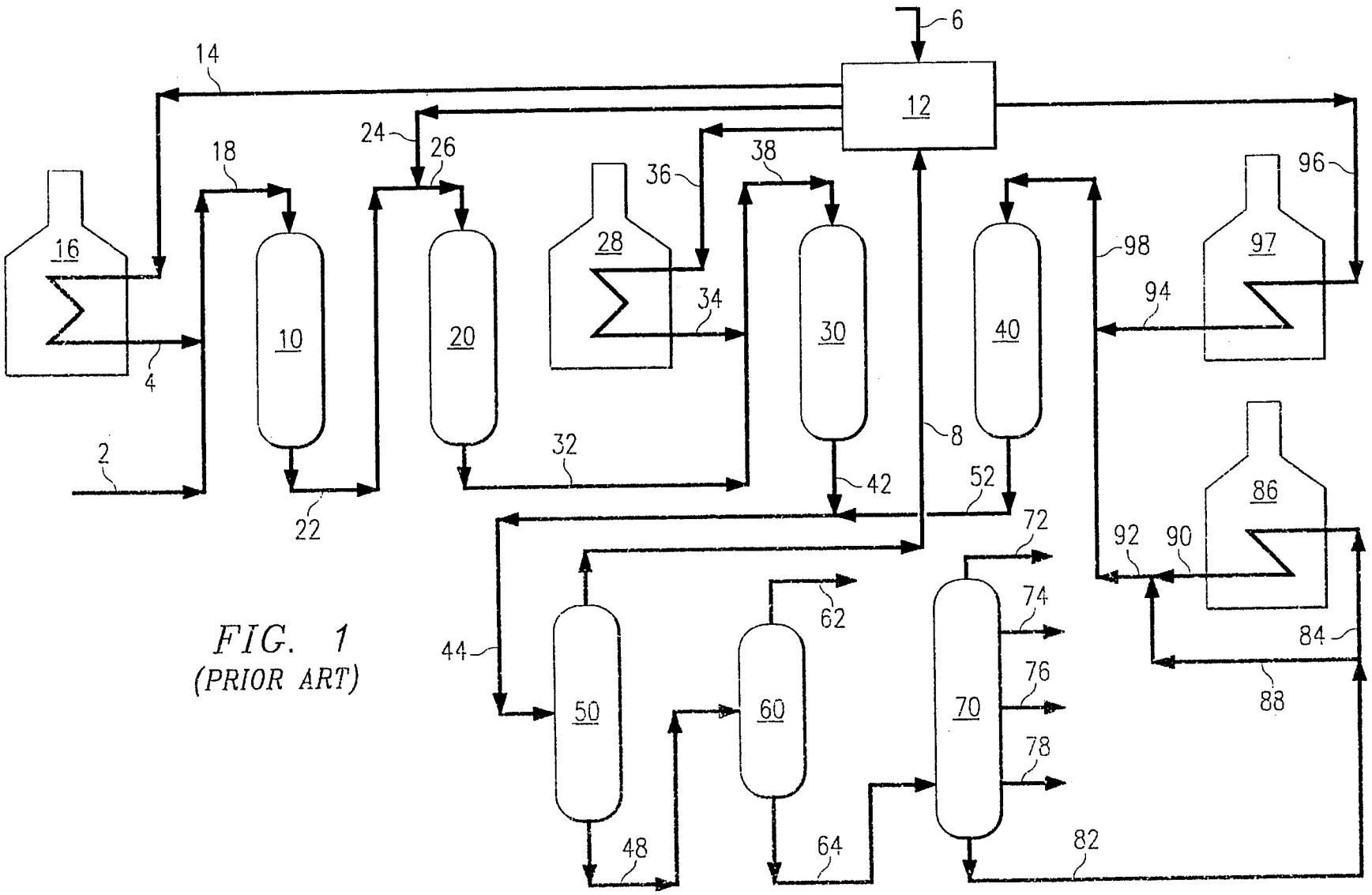
FIG. 1 (PRIOR ART)
FIG. 1 is a schematic representation of a prior art two stage hydrocracking process unit configuration for converting hydrocarbonaeous feed to lower boiling products.

FIG. 1 is a prior art two-stage hydrocracking process. The process employs four reactors: two hydrotreating reactors 10 and 20 and two hydrocracking reactors 30 and 40. Prior art hydrotreating and hydrocracking reactors typically direct a downflow of reactants in the presence of free hydrogen over a series of fixed beds of one or more catalysts. The first reactor 10 serves as a hydrotreater. Fresh feed 2 is combined with added hydrogen 4. The added hydrogen stream 4 is typically a mixture 12 of makeup hydrogen 6 and hydrogen-rich recycle gas 8. The hydrogen mixture 12 can be formed by a mixing device such as a compressor or can be formed by simply connecting or combining the two different hydrogen streams 6 and 8. The mixture 12 is passed via conduit 14 to heater 16 for preheating stream 4 to a temperature necessary for desired reaction temperature, and preferably heated stream 4 has sufficient sensible heat to raise the temperature of feed stream 2 to desired reaction temperature.

Typical fresh feeds 2 in commercial operations include materials from a fluid catalytic cracking unit, a coker or coker fractionator, or straight run materials from a crude unit, or mixtures of streams of such materials. Such feeds 2 generally have a boiling range from about 350° F. to about 1100° F. and may comprise from about 100 ppm to 5,000 ppm nitrogen and often comprise sulfur-containing compounds. The combined fresh feed 2 and hydrogen 4 is fed via conduit 18 to the first hydrotreating zone 10. Often, prior art hydrotreating zones 10 are loaded with hydrotreating catalyst (not shown) wherein the catalyst is loaded in separate beds or segments in the reactor 10, with multiple hydrogen injection facilities (not shown) between the segments for cooling the exothermic reaction mix with injected hydrogen streams.

Various hydrotreating catalysts are well known in the art and are generally high activity desulfurization and denitrogenation catalysts selected to, and effective to, convert sulfur and nitrogen compounds in the feed to $H_2S$ and $NH_3$ and other byproducts to avoid sulfur and nitrogen inhibition of subsequent hydrocracking reactions. The hydrogenation component of hydrotreating catalysts typically comprise one or more metals selected from the group consisting of cobalt, nickel, tungsten, chromium, molybdenum, platinum and palladium. Various prior art hydrogenation components of catalysts are described in U.S. Pat. No. 5,023,221 to Occelli, the disclosure of which is incorporated herein by reference.

The hydrotreated effluent 22 from the first reactor 10 is mixed with added hydrogen 24 and passed via conduit 26 to the second reactor 20. The second reactor 20 is also configured as a hydrotreater. The added hydrogen 24 is typically a mixture 12 of makeup hydrogen 6 and hydrogen-rich recycle gas 8. Hydrogen stream 24 is preferably not preheated. Since the hydrotreating reaction in the first reactor 10 and second reactor 20 is exothermic, hydrogen 24 is added for cooling and reaction control purposes.

Where two hydrotreaters 10 and 20 are employed, for ease of maintenance, sparing of parts, and convenience of operations or process control, the second reactor 20 and the first reactor 10 may have the same or similar mechanical configurations and may be loaded with the same or similar hydrotreating catalysts, although symmetry is not required.

The second reactor 20 may be loaded with a different hydrotreating catalyst than the first reactor 10 and may be sized or configured differently or operated at different temperatures, space velocities, and hydrogen and liquid feed rates and other conditions.

In typical prior art hydroprocessing pretreatment operations, the operating pressure of a hydrotreater 10 or 20 is maintained at a range of about 1,200 psia to about 2,500 psia, and reactor 10 or 20 operating temperature is typically in the range of about 600° F. to about 790° F. Hydrotreater 10 or 20 hydrogen-to-oil (added hydrogen to feed) ratio [mol/mol] is generally in the range of about 5 to 15. Reactor 10 or 20 space velocity (liquid hourly space velocity, LHSV), on a representative liquid feed basis without considering hydrogen flow, is typically in the range of about 0.5 to 3.5 [$hr^{-1}$]. Typically, for reactors 10 and 20, about 1 to 20 percent of feed range material 2 is converted to hydrotreater product range material 32.

In the prior art multi-reactor configuration shown in FIG. 1, the third reactor 30 serves as a first stage hydrocracker. The effluent 32 from the second stage reactor 20 is Combined with added hydrogen 34 and passed as feed 38 to the third reactor 30. Generally, in typical prior art hydrocracking processes, the feed 32 to a hydrocracker 30 boils in the range of about 300° F. to about 1,100° F. and may comprise from about 0.1 ppm to about 100 ppm nitrogen. Typically, hydrogen mixture 12, a mixture of makeup hydrogen 6 and hydrogen-rich recycle gas 8, is passed via conduit 36 to a heater 28 where the hydrogen 36 is preheated to the desired reaction temperature before being fed as stream 34 to reactor 30. Preferably, hydrogen 34 is preheated to a temperature necessary for desired reaction temperature wherein heated hydrogen stream 34 has sufficient sensible heat to raise the temperature of feed stream 32 to the desired reaction temperature.

In prior art middle distillate hydrocracking processes, the first stage hydrocracking zone 30 combines severe hydrotreatment at elevated temperature and pressure, in the presence of a hydrocracking catalyst selective for diesel, to convert heteromolecular compounds such as organic nitrogen, sulfur, and oxygen compounds with partial hydrocracking of heavier components of the feed 38 to lighter products.

Although not required, the hydrocracking reactor 30 may be loaded with hydrocracking catalyst (not shown) wherein the catalyst is loaded in separate beds or segments in the reactor, with multiple hydrogen injection facilities (not shown) between the segments for cooling the exothermic reaction mix with hydrogen streams. Typical hydrocracking catalysts are well known in the art, and generally combine a strong hydrogenation function with a mildly acidic support. Various prior art middle distillate hydrocracking catalysts are described in U.S. Pat. No. 5,023,221 to Occelli, the disclosure of which is incorporated herein by reference.

The effluent 42 from the third reactor 30 is combined with the effluent 52 from the fourth reactor 40 and the combined stream 44 is flashed in a high pressure separator 50 to separate out hydrogen-rich recycle gas 8. The high pressure separator 50 bottoms 48 is passed to a low pressure separator 60 where lighter gases 62 are removed. The low pressure separator 60 bottoms 64 is fractionated in a fractionator 70 to remove light fractions 72, gasoline range 74 materials and jet range materials 76 from diesel or other product 78. The number of, and cutpoints of, fractions 72, 74, 76 and 78 are determined by each refiner's desired product slate.

The heaviest fraction 82 from the fractionator 70, which is typically the fractionator 70 bottoms, comprises unconverted oil. This stream 82 may be passed via conduits 88 and 92 and combined with added hydrogen 94 for direct recycle via conduit 98 to the fourth reactor 40. Preferably, stream 82 is passed via conduit 84 through heater 86 to raise preheat stream 82 to raise the temperature of heated stream 90 near or to a desired reaction temperature, and from heater 86, stream 90 is passed via conduit 92 and combined with added hydrogen 94 for recycle via conduit 98 to the fourth reactor 40. The added hydrogen 94 is usually a mixture 12 of makeup hydrogen 6 and hydrogen-rich recycle gas 8 which is passed via conduit 96 for preheating in heater 97 to a desired reaction temperature or preheating, if and as needed, to raise the temperature of stream 92 to the desired reaction temperature.

In typical prior art hydrocracking operations, the pressure of a hydrocrackers 30 or 40 is maintained at a range of about 1,200 psia to about 2,500 psia, and the reactor 30 or 40 operating temperature is typically in the range of about 500° F. to about 790° F. Hydrocracker 30 or 40 hydrogen-to-oil (added hydrogen to feed) ratio [mol/mol] is generally in the range of about 8 to about 25. Reactor 30 or 40 space velocity (LHSV) is typically in the range of about 1 to about 3 [$hr^{-1}$]. Also, in such prior art processes, about 30 to about 80 percent of the feed range material 44 is converted to product range material 78.

Figure 2:
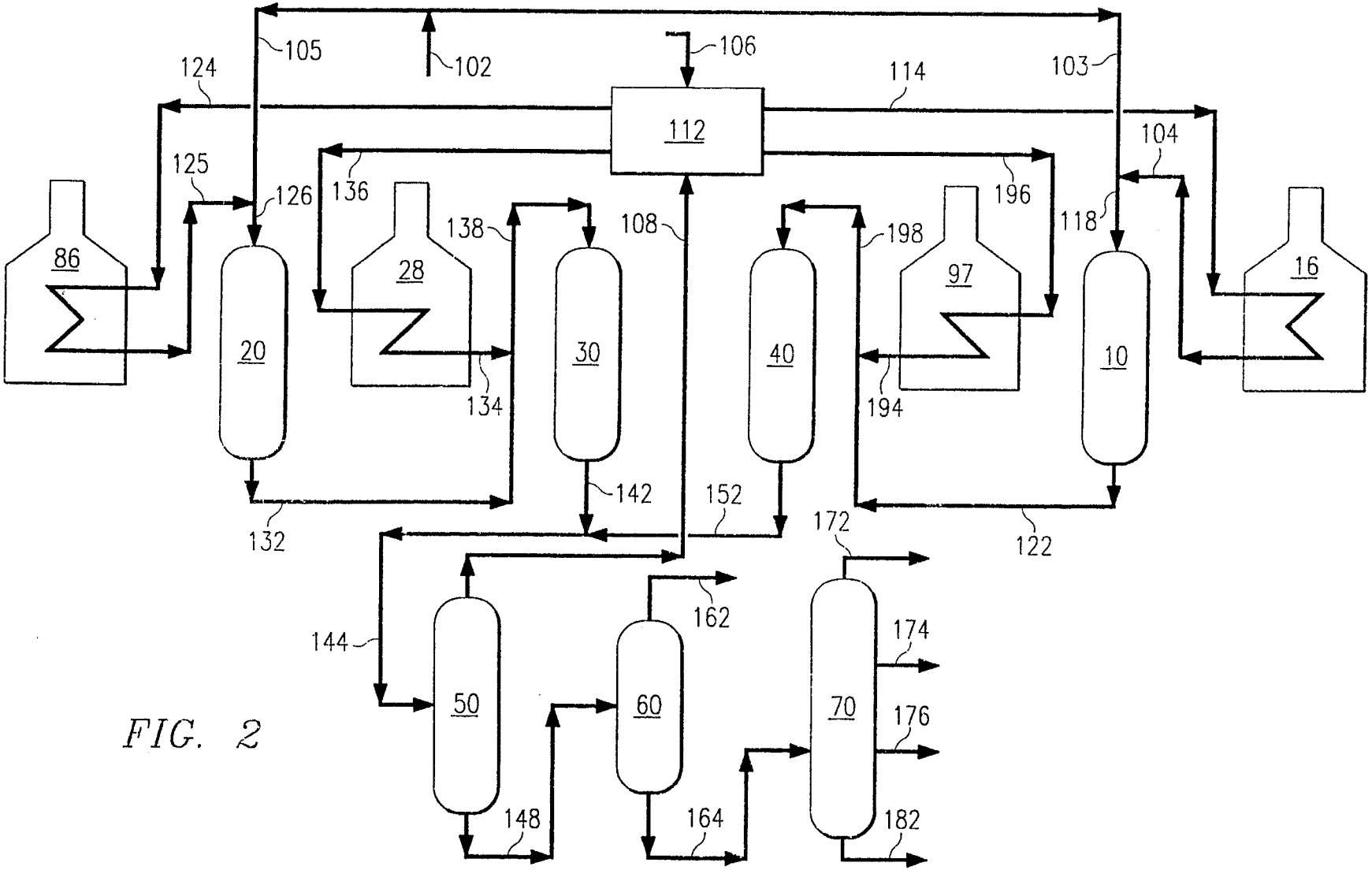
FIG. 2 is a schematic representation a once-through catalytic hydrocracking process of this invention for producing clean diesel from selected feedstocks.

FIG. 2 shows one preferred embodiment of this invention wherein the single process unit made up of two hydrotreaters and two hydrocrackers as shown in FIG. 1 is reconfigured into two parallel once-through units as shown in FIG. 2. The one multi-stage recycle configuration of FIG. 1 is converted to two once-through hydrotreater and hydrocracker configurations.

For purposes of illustration in FIG. 2, the same identifying numerals, as assigned and used in FIG. 1 are used in FIG. 2 and in the discussion of FIG. 2 to identify the reactors 10, 20, 30, and 40; the separators 50 and 60; the fractionator 70; and heaters 16, 28, 86 and 97 and to identify certain other components.

As shown in FIG. 2, the first hydrotreater 10 and the second hydrocracker 40 are combined to form one once-through hydrocracking unit. The second hydrotreater 20 and the first hydrocracker 30 are combined to form a second once-through hydrocracking unit. Although not shown, the first reactor 10 could be combined with the third reactor 30 and the second reactor 20 could be combined with the fourth reactor 40. For the reconfiguration as shown, the reactors 10, 20, 30, and 40; the separators 50 and 60; fractionator 70; and heaters 16, 28, 86, and 97 need not be physically moved or otherwise relocated; instead, only associated piping and support equipment are modified or relocated as will be apparent to those skilled in the art from the teaching herein.

In FIG. 1, feed flows through the first three reactors 10, 20 and 30 in series and then, after the high pressure 50 and low pressure 60 separators, into the fractionator 70 with recycle oil 82 from the fractionator 70 being fed to the fourth reactor 40. For the reconfigured operation shown in FIG. 2, clean diesel production preferably takes place in one or both of two parallel once-through operations with no recycle. Preferably, reactors 20 and 30 remain in series, with reactor 20 serving as the hydrotreater and reactor 30 serving as the hydrocracker. Also, preferably, reactors 10 and 40 are placed in series, with reactor 10 serving as the hydrotreater and reactor 40 serving as the hydrocracker.

As reconfigured, fresh feed 102 is split into two streams 103 and 105. Fresh feed stream 103 is combined with added hydrogen 104 and is fed to the first reactor 10 via conduit 118. Preferably, the added hydrogen 104 is a mixture 112 of makeup hydrogen 106 and hydrogen-rich recycle gas 108 which mixture 112 is passed via conduit 114 to heater 16 for preheating hydrogen 114 to a temperature necessary for desired reaction temperature, and preferably heated hydrogen stream 104 has sufficient sensible heat to raise the temperature of feed stream 103 to the desired reaction temperature. The hydrogen mixture 112 can be formed by a mixing device such as a compressor or can be formed by simply connecting or combining the two different hydrogen streams 106 and 108. Also, fresh feed stream 105 is combined with added hydrogen 125 and is fed to the second reactor 20 via conduit 126. Preferably, the added hydrogen 125 is a mixture 112 of makeup hydrogen 106 and hydrogen-rich recycle gas 108 which mixture 112 is passed via conduit 124 to heater 86 for preheating hydrogen 124 to a temperature necessary for desired reaction temperature, and preferably heated hydrogen stream 125 has sufficient sensible heat to raise the temperature of feed stream 105 to the desired reaction temperature.

In the embodiment shown in FIG. 2, both the first reactor 10 and second reactor 20 serve as hydrotreaters. Preferably, both the first reactor 10 and second reactor 20 are loaded with the same or similar catalyst (not shown) and are operated at the same or similar conditions of temperature and pressure and hydrogen feed configuration, space velocities and associated feed rates; however, the reactors 10 and 20 can be loaded with different catalyst and may be operated at different rates of feeds 118 and 126 and other conditions.

In one preferred variation of this embodiment, reactors 10 or 20 are operated at an inlet pressure in the range of about 1,450 to about 2,100 psig, and more preferably in the range of about 1,700 to about 1,800 psig. More preferably, reactors 10 or 20 are operated at an inlet temperature in the range of about 550° F. to about 700° F. and an outlet temperature in the range of about 680° F. to about 780° F. Hydrotreater 10 or 20 hydrogen-to-oil (added hydrogen 125 to feed 105) ratio [mol/mol] is preferably in the range of about 5 to 15. Reactor 10 or 20 space velocity (liquid hourly space velocity, LHSV), is preferably in the range of about 0.5 to 3.5 [$hr^{-1}$]. Preferably reactors 30 or 40 are operated at an inlet pressure in the range of about 1,400 to about 2,050 psig. More preferably, reactors 30 or 40 are operated at an inlet temperature in the range of about 680° F. to about 760° F. and an outlet temperature in the range of about 690° F. to about 780° F. Hydrocracker 30 or 40 hydrogen-to-oil (added hydrogen to feed) ratio [mol/mol] is preferably in the range of about 8 to about 25. Reactor 30 or 40 space velocity (LHSV) is preferably in the range of about 1 to about 3 [$hr^{-1}$].

The effluent 122 from the first reactor 10 is combined with added hydrogen 194 and fed via conduit 198 to the fourth reactor 40 which serves as a hydrocracker. Preferably, the added hydrogen 194 is a mixture 112 of makeup hydrogen 106 and hydrogen-rich recycle gas 108 which mixture 112 is passed via conduit 196 to heater 97 for preheating hydrogen 196 to a temperature necessary for desired reaction temperature, and preferably heated hydrogen stream 194 has sufficient sensible heat, to raise the temperature of feed stream 122 to the desired reaction temperature.

The effluent 132 from the second reactor 20 is combined with added hydrogen 134 and fed via conduit 138 to the third reactor 30 which also serves as a hydrocracker. Preferably, the added hydrogen 134 is a mixture 112 of makeup hydrogen 106 and hydrogen-rich recycle gas 108 which mixture 112 is passed via conduit 136 to heater 28 for preheating hydrogen 136 to a temperature necessary for desired reaction temperature, and preferably heated hydrogen stream 134 has sufficient sensible heat to raise the temperature of feed stream 132 to the desired reaction temperature. Preferably, both the third reactor 30 and fourth reactor 40 are loaded with the same or similar catalyst and are operated at the same or similar conditions of temperature and pressure and hydrogen feed configuration, space velocities and associated feed rates; however, the reactors 30 and 40 can be loaded with different catalyst and may be operated at different rates of feed 138 and 198 and other conditions.

The effluent 142 from the third reactor 30 is preferably combined with the effluent 152 from the fourth reactor 40 and the combined stream 144 is flashed in a high pressure separator 50 to separate out hydrogen-rich recycle gas 108. The high pressure separator 50 bottoms 148 is passed to a low pressure separator 60 where light gases 162 are removed. The low pressure separator 60 bottoms 164 is preferably fractionated in a fractionator 70 to remove lighter fractions 172, gasoline range 174 and jet range material 176. Clean diesel is recovered as fractionator 70 bottoms 182.

To produce diesel and, where clean diesel production is desired, one skilled in the hydrocracking and diesel production art would start with a prior art hydrocracking catalyst "selective" for diesel production. The selectivity of a catalyst is generally determined by those skilled in the art by comparing the yield (as a percentage fraction) of a broad diesel range (boiling from about 400° F. to about 710° F.) materials against yield of jet range (boiling from about 330° F. to about 550° F.) or gasoline range (boiling from about 80° F. to about 380° F.) materials or other products of the hydrocracking process. Diesel selective catalysts typically have a higher ratio of metals to acid components and are used for maximum production of diesel.

I have discovered that diesel range selective hydrocracking catalysts may have negative properties in relation to the production of clean diesel, and I have further discovered that gasoline range selective catalysts have favorable properties, when applied to selected feedstocks, in the production of clean diesel. In the production of clean diesel, I have found that it is desirable to hydrocrack a diesel range feedstock and to employ a gasoline selective catalyst, preferably one which has a lower ratio of metals (hydrogenation) to acid (cracking) components. As used in the specification and claims, the term "gasoline selective catalyst" means a hydrocracking catalyst which, for a given heavy feed and fixed hydrocracker feed rate, temperature and other conditions, offers a higher conversion of such heavy feed to a lighter than feed product in the gasoline range over conversion to middle distillate fractions such as turbine or diesel fuels. Gasoline selectivity may be determined experimentally by testing various catalysts at constant hydrocracking conditions using the same heavy feed and by measuring and comparing the percentage gasoline, jet and diesel fractions produced, with a gasoline selective gasoline catalyst producing a relatively larger gasoline fraction as compared to a catalyst which not gasoline selective.

I have found that when a gasoline selective catalyst is applied in hydrocracking in combination with a feedstock which is selected to consist essentially of diesel range materials, preferably boiling within a range of about 400° F. to about 710° F., a clean diesel fuel is produced which is unusually compatible with diesel engines.

EXAMPLE 1

Two candidate test fuels were produced. The first candidate fuel (identified as SC-1) was produced by feeding to a two stage hydrocracker (referring to FIG. 1), adjusted and operated, however, to have no recycle hydrocarbon streams to either of the hydrotreaters 10 or 20 or to the first stage hydrocracker 30, a feed consisting essentially of 64 percent straight-run diesel and 36 percent fluid catalytic cracker light cycle oil ("FCC LCO"), boiling approximately 430° F. to 680° F. SC-1 was collected as product from stream 42 (again referring to FIG. 1). Operating conditions for the hydrotreaters 10 and 20 and hydrocracker 30 were within conditions as described above for embodiments of this invention as detailed above. The following are the properties, as determined by the applicable ASTM method, of the feed 2 used in this Example 1:

| | |
|---|---|
| °API gravity | 26.1 |
| Molecular weight | 239 |
| Sulfur, weight percent | 0.58 |
| Nitrogen, parts per million | 371 |
| Bromine number | 4.0 |
| D2887, Degrees F. | |
| Initial boiling point | 329 |
| 10% | 479 |
| 30% | 540 |
| 50% | 579 |
| 70% | 621 |
| 90% | 678 |
| 95% | 703 |
| End point | 764 |

Samples were collected from the effluent 42 of the first stage hydrocracker 30 (again referring to FIG. 1). The samples were fractionated. Seven runs were made on a 150 gallon packed column batch still at a 5:1 reflux ratio. A diesel cut was extracted from the above, being the fractions boiling over 420° F. This diesel cut was the first candidate test fuel SC-1.

The second candidate fuel (identified as SC-2) was produced by preparing a mixture of 50 volume % first candidate fuel SC-1 with 50 volume % of a low sulfur (0.05%) diesel from a commercial diesel treater. Analytical test results for six fuel characteristics of the first (SC-1) and second (SC-2) test candidate fuels and reference fuel SC-3R were as follows:

| | SC-1 | SC-2 | SC-3R |
|---|---|---|---|
| Cetane number (per ASTM D-613-84) | 53.9 | 51.9 | 49.4 |
| Total aromatics, % vol (per ASTM D-1319-84) | 22.8 | 29.6 | 10.0 |
| Polycyclic aromatics, % vol (per ASTM D-2425-83) | 4.7 | 6.2 | 1.1 |
| Sulfur content, ppmw (per ASTM D-2622-82) | 42 | 249 | 475 |
| Nitrogen content, ppmw (per ASTM D-4629-86) | 2.2 | 40 | 5 |
| Required Additives (fuel was tested without addition of additives other than materials with the sole effect of enhancing cetane): | none | none | none |

EXAMPLE 2

Cold-start and hot-start emissions tests were conducted for candidate diesel fuels (SC-1 and SC-2) prepared as set forth in Example 1 in accordance with the methods of this invention were conducted, along with tests of a formulation of CARB specified California Reference Fuel (SC-3R). The tests were conducted according to the EPA Federal Test Procedure specified in Title 40 Code of Federal Regulations ("CFR"), Part 86, Subpart N. A screening test procedure was used which incorporates procedures for instrumentation and sample systems calibrations, fuel changing, engine performance, sample analysis, transient test performance, and review of emissions data. The following specific test sequence was used:

| Step | Description |
|---|---|
| 1. | Perform emission instrument calibrations as required. Calibrate torquemeter and check signal conditioning systems. Validate CVS gaseous and particulate sampling systems using propane recovery techniques. |
| 2. | Check engine condition, note fault codes if any. Bring engine oil level to "full" using REO-216 oil. |
| 3. | Perform fuel change procedure to test fuel, change filter and purge fuel supply. Warm up engine on test fuel. |
| 4. | Operate engine at rated speed and load for approximately 20 minutes, then power validate the engine. |
| 5. | Conduct transient full-throttle torque map from low- to high-idle and compute and save resulting transient command cycle. |
| 6. | Run two 20-minute EPA transient cycles and adjust dynamometer controls to meet statistical limits for transient cycle operation using transient command cycle obtained in step 5. |
| 7. | Allow engine to stand inoperative overnight in test cell ambient. |
| 8. | Perform a cold-start and hot-start transient emissions test for hydrocarbons, carbon monoxide, $NO_x$ and total particulate matter. Obtain additional samples of total particulate for sulfates and soluble organic fraction ("SOF"). |
| 9. | Perform fuel change procedure to next candidate fuel. Change filter and purge fuel supply. |
| 10. | Repeat, for next candidate fuel, steps 4 through 8. |
| 11. | Process total particulate samples for sulfate and SOF using the barium chloranilate ("BCA") procedure and applicable Soxhlet procedures, respectively. The BCA method was used to access the sulfate levels contained in total particulate samples collected on 47 mm Fluoropore filter media during the transient test work. Both the BCA and Soxhlet procedures are well known in the analytical art. |

The above test procedure is used to provide information for identifying fuel formulations with potential to meet the CARB requirements for a certified diesel fuel. The above test procedure was for screening purposes only and was not intended as a substitute for CARB test protocol given in subparagraph g, Section 2282, Aromatic Content of Diesel Fuel of Title 13, California Code of Regulations ("CCR"). This procedure is an effective and low cost method to obtain cold-start and hot-start transient emissions results for hydrocarbons, CO, $NO_x$, total particulates, sulfates, and SOF. Methods used in this procedure for the measurement of hydrocarbons, CO, $NO_x$, and total particulates are as described in the above referenced Subpart N of 40 CFR Part 86. SOF was determined by extracting a 47 mm Pallflex particulate filter collected during each transient cycle with micro-Soxhet apparatus, using a toluene:ethanol solvent mixture, as specified by Section 2282 of CCR. Larger samples of total particulate were collected on 20×20-inch Pallflex filter media during transient testing. These large filters were extracted with methylene chloride and resulting SOF levels were determined by the filter weight loss method.

Each of the two candidate fuels (SC-1 and SC-2) and the CARB-specified California Reference Fuel (SC-3R) were tested. Table 1 sets forth the emission measurements in the transient emission screening of the two candidate fuels and the CARB-specified California Reference Fuel. Table 2 summarizes the composite transient emissions of the candidate fuels and the CARB-specified California Reference Fuel and provides comparison to applicable Federal and California regulated emissions standards of hydrocarbons, CO, $NO_x$, and total particulate.

In Tables 1 and 2 below (as well as Tables 3 and 4 appearing later), (i) "HC" is used to represent hydrocarbons; (ii) "CO" is used to represent carbon monoxide; (iii) "$NO_x$" is used to represent total oxides of nitrogen; (iv) "Part." is used to represent total particulate; (v) "SOF" is used to represent soluble organic fraction; (vi) "sulfate" is used to represent sulfates determined by the barium chloranilate method; and (vii) "ref. work" is reference work load of test engine.

TABLE 1

Cold-start and Hot-start Transient Emissions using Candidate Fuels prepared in accordance with one variation one embodiment of this invention.

| | Cold-start Transient Emissions, g/hp-hr | | | | | | | | |
|---|---|---|---|---|---|---|---|---|---|
| Fuel | HC | CO | $NO_x$ | Part. | Sulfate | Total Part. SOF Toluene: Ethanol | Total Part. SOF Methylene Chloride | Work hp-hr | Ref. Work hp-hr |
| SC-1 | 0.080 | 1.54 | 5.89 | 0.139 | 0.00224 | 0.05449 | 0.04101 | 22.26 | 23.12 |
| SC-2 | 0.088 | 1.63 | 5.92 | 0.138 | 0.00363 | 0.05382 | 0.03740 | 22.41 | 23.12 |
| SC-3R | 0.113 | 1.77 | 5.66 | 0.289 | 0.0123 | 0.044 | — | 22.20 | 23.77 |

| | Hot-start Transient Emissions, g/hp-hr | | | | | | | | |
|---|---|---|---|---|---|---|---|---|---|
| Fuel | HC | CO | $NO_x$ | Part. | Sulfate | Total Part. SOF Toluene: Ethanol | Total Part. SOF Methylene Chloride | Work hp-hr | Ref. Work hp-hr |
| SC-1 | 0.090 | 1.24 | 3.88 | 0.164 | 0.00198 | 0.04330 | 0.02394 | 22.36 | 23.12 |
| SC-2 | 0.118 | 1.34 | 4.09 | 0.172 | 0.00391 | 0.04386 | 0.02838 | 22.51 | 23.12 |
| SC-3R | 0.138 | 1.44 | 3.97 | 0.185 | 0.00433 | 0.0417 | — | 22.39 | 23.77 |

TABLE 2

Composite Transient Emissions using Candidate Fuels prepared in accordance with one variation of one embodiment of this invention

| | HC | CO | $NO_x$ | Part. | Sulfate | Total Part. SOF Toluene: Ethanol | Total Part. SOF Methylene Chloride | Work hp-hr | Ref. Work hp-hr |
|---|---|---|---|---|---|---|---|---|---|
| 1988 Cal Reg | 1.3 | 15.5 | 6.0 | 0.6 | — | — | — | — | — |
| 1991 Fed Reg | 1.3 | 15.5 | 5.0 | 0.25 | — | — | — | — | — |
| 1994 Fed Reg | 1.3 | 15.5 | 5.0 | 0.1 | — | — | — | — | — |
| SC-1 | 0.089 | 1.28 | 4.17 | 0.161 | 0.00202 | 0.04489 | 0.02637 | 22.35 | 23.12 |
| SC-2 | 0.114 | 1.38 | 4.35 | 0.167 | 0.00387 | 0.04528 | 0.02966 | 22.50 | 23.12 |
| SC-3R | 0.141 | 1.52 | 4.29 | 0.216 | 0.0063 | 0.044 | — | 22.34 | 23.77 |

Please note that the methylene chloride based test for SOF is not required for purposes of certification. Also, please note certain numbers were rounded, as is acceptable convention.

EXAMPLE 3

Two additional candidate test diesel fuels D-25 and D-26 were prepared in a manner similar to the methods described in Example 1 for preparing fuels SC-1 and SC-2. D-25 was produced by feeding, to a two stage hydrocracker (referring to FIG. 1) adjusted to have no recycle hydrocarbon streams to either of the hydrotreaters 10 or 20 or to the first stage hydrocracker 30, a feed consisting essentially of 68 percent straight-run diesel and 32 percent fluid catalytic cracker light cycle oil ("FCC LCO"), boiling approximately 430° F. to 680° F. D-25 was collected as product from stream 42 (again referring to FIG. 1). In a similar manner, D-26 was produced by feeding, to a two stage hydrocracker (referring to FIG. 1) adjusted to have no recycle hydrocarbon streams to either of the hydrotreaters 10 or 20 or to the first stage hydrocracker 30, a feed consisting essentially of 62 percent straight-run diesel and 38 percent fluid catalytic cracker light cycle oil ("FCC LCO"), boiling approximately 430° F. to 680° F. D-26 was also collected as product from stream 42 (again referring to FIG. 1). Operating conditions for the hydrotreaters 10 and 20 and hydrocracker 30 were within conditions as described above for embodiments of this invention as detailed above. Stream samples for D-25 and D-26 were fractionated to separate out a diesel cut. An analysis of each of D-25 and D-26 gave the following results:

| | Test Fuel D-25 | Test Fuel D-26 |
|---|---|---|
| Cetane number (per ASTM D-613-84) | 55.2 | 56.2 |
| Total aromatics, % vol (per ASTM D-1319-84) | 21.7 | 24.7 |
| Polycyclic aromatics, % vol (per ASTM D-2425-83) | 4.6 | 4.0 |
| Sulfur content, ppmw (per ASTM D-2622-82) | 33 | 42 |
| Nitrogen content, ppmw (per ASTM D-4629-86) | 20 | 40 |
| Required additives (fuel was tested without addition of additives other than materials with the sole effect of enhancing cetane): | none | none |

EXAMPLE 4

Hot-start transient emissions results were accumulated in two separate ten day tests using a 1991 prototype Detroit Diesel Corporation Series 60 heavy duty diesel engine. One test used a California Reference Fuel CREF4 (also identified as EM-1588F) and candidate fuel D-25 prepared as set forth in Example 3. The second test used the California Reference Fuel CREF4 and candidate fuel D-26 prepared as set forth in Example 3.

All transient emissions tests were conducted according to EPA Federal Test Procedure specified in Title 40, CFR, Part 86, Subpart N. The CARB testing protocol set forth in the applicable California regulations was applied (after submission of test protocol to CARB and approval of test protocol by CARB) with following specific test sequence:

| Step | Description |
|---|---|
| 1. | Perform emission instrument calibrations as required. Calibrate torquemeter and check signal conditioning systems. Validate CVS gaseous and particulate sampling systems using propane recovery techniques. |
| 2. | Check engine condition using a low sulfur emisssions type fuel, note fault codes if any. Bring engine oil level to "full" using REO-216 oil. |
| 3. | At the beginning of the first day of testing, perform fuel change procedure to operate on CREF4 reference fuel. Change filter and purge fuel supply. |
| 4. | Warm up engine and operate at rated speed and load, then check performance. |
| 5. | Conduct transient full-throttle torque map from low- to high-idle and compute and save resulting transient command cycle. |
| 6. | Run two 20-minute practice of conditioning transient cycles without a 20-minute soak between cycles and adjust dynamometer controls to meet statistical limits for transient cycle operation using transient command cycle obtained in step 5 for reference fuel CREF4. |
| 7. | After a 20-minute engine soak, run a hot-start transient cycle for HC, CO, $NO_x$, and total particulate emissions. Obtain additional samples of total particulate for sulfate and SOF at each cycle. |
| 8. | Change to test candidate fuel as in Step 3 and precondition as in Steps 4–6. Perform Step 7 twice to accumulate data for two hot-start transient cycles. |
| 9. | Repeat Steps 3–7 with Reference Fuel CREF4. |
| 10. | On each of Days 2 through 10 of testing, repeat Steps 4–7 with Reference Fuel CREF4, then repeat Step 8 with candidate test fuel, and then repeat Steps 3–7 with Reference Fuel CREF4. |

Procedures used for measurement of HC, CO, $NO_x$, and total particulates are as described in the above referenced Subpart N of 40 CFR Part 86. Sulfate is collected as "particulate" and its weight, as part of particulate matter emission, was assessed by an ion chromatographic procedure, selected from those known in the analytical art, applied to particulate matter samples collected on 47 mm Fluoropore filter media during the transient test work. SOF was determined by extracting particulate-laden 47 mm Pallflex filters using micro-Soxhlet apparatus with toluene-ethanol solvent as specified by the California Code of Regulations under Section 2282.

The results of the two tests are set forth in Tables 3 and 4 below. These results indicate that the candidate fuels D-25 and D-26 produced by variations of embodiments of a once-through hydrocracking process of this invention consistently had lower average emissions than the Reference Fuel CREF4.

TABLE 3

Hot-start Transient Emissions using Candidate Fuel D-25 prepared in accordance with one variation of one embodiment of this invention as compared against Reference Fuel CREF4

| | HC | CO | $NO_x$ | Part. | Sulfate | Total Part. SOF Toluene: Ethanol | Total Part. SOF Methylene Chloride | Work hp-hr | Ref. Work hp-hr |
|---|---|---|---|---|---|---|---|---|---|
| 1988 Cal Reg | 1.3 | 15.5 | 6.0 | 0.6 | — | — | — | — | — |
| 1991 Fed Reg | 1.3 | 15.5 | 5.0 | 0.25 | — | — | — | — | — |
| 1994 Fed Reg | 1.3 | 15.5 | 5.0 | 0.1 | — | — | — | — | — |
| D-25 | 0.118 | 1.18 | 3.93 | 0.156 | 0.00054 | 0.034 | — | 22.26 | 23.43 |
| CREF4 | 0.173 | 1.38 | 4.00 | 0.158 | 0.00454 | 0.039 | — | 22.35 | 23.43 |

TABLE 4

Hot-start Transient Emissions using Candidate Fuel D-26 prepared in accordance with one variation of one embodiment of this invention as compared against Reference Fuel CREF4

| | HC | CO | $NO_x$ | Part. | Sulfate | Total Part. SOF Toluene: Ethanol | Total Part. SOF Methylene Chloride | Work hp-hr | Ref. Work hp-hr |
|---|---|---|---|---|---|---|---|---|---|
| 1988 Cal Reg | 1.3 | 15.5 | 6.0 | 0.6 | — | — | — | — | — |
| 1991 Fed Reg | 1.3 | 15.5 | 5.0 | 0.25 | — | — | — | — | — |
| 1994 Fed Reg | 1.3 | 15.5 | 5.0 | 0.1 | — | — | — | — | — |
| D-26 | 0.101 | 1.14 | 4.02 | 0.160 | 0.00065 | 0.035 | — | 22.50 | 23.69 |
| CREF4 | 0.151 | 1.36 | 4.07 | 0.162 | 0.00455 | 0.041 | — | 22.52 | 23.69 |

Both fuels D-25 and D-26, each having an aromatics content greater than 20%, met the requirements for certification by CARB. These positive certification results are contrary to the conclusion of Nikanjam, discussed above, that Nikanjam's "experience suggested aromatics would have to be at or below the 20% level" to meet CARB standards. Applying to fuels D-25 and D-26 Nikanjam's predictive model, as set forth in Nikanjam's paper, for $NO_x$ as a function of cetane number and aromatics, wherein $NO_x$ (g/bhp-h)=5.296—(0.0161)(Cetane)+(0.0281)(Aromatics), the model would predict that inventive formulas D-25 and D-26 would not pass certification tests.

While the invention has been described in conjunction with presently preferred embodiments, it is not limited thereto. For example, it is .possible, with adjustment of hydrocracking conditions, to employ in the production of a clean diesel of this invention, a balanced hydrocracking catalyst (e.g. relatively equal cracking and hydrogenation functionalities) which is typically used in the prior art for coproduction of diesel, turbine fuel and naphtha from heavy, refractory feedstock. Also, it is possible to feed lighter components (e.g. gasoline range materials) with a preferred diesel range feed. In addition, one or more cetane enhancers, such as nitrated hydrocarbon derivatives like amyl nitrate and octyl nitrate, as well as others known in the art may be added to a clean diesel of invention for the purpose of enhancing cetane. Also, one can convert a single one-stage two reactor recycle operation to a once-through hydrocracking configuration of this invention.

I claim:

1. A diesel fuel, having reduced, or at least substantially equivalent, emissions of oxides of nitrogen as compared to a reference fuel containing 10% by volume aromatics prepared in accordance with Title 13, California Code of Regulations effective at Oct. 1, 1993, characterized by:

a. a cetane number (per ASTM D-613-84) not less than 55.2; and, b. total aromatics (per ASTM D-1319-84), not less than 21 percent by weight nor greater than 21.7 percent by weight.

2. A diesel fuel in accordance with claim 1 further characterized by:

a. polycyclic aromatics (per ASTM D-2424-83) not greater than about 4.6 percent by weight;

b. sulfur content (per ASTM D-2622-82) not greater than about 33 parts per million by weight; and, c. nitrogen content (per ASTM D-4629-86) not greater than about 20 parts per million by weight.

3. A diesel fuel, having reduced, or at least substantially equivalent, emissions of oxides of nitrogen as compared to a reference fuel containing 10% by volume aromatics prepared in accordance with Title 13, California Code of Regulations effective at Oct. 1, 1993, characterized by:

a. a cetane number (per ASTM D-613-84) not less than 56.2; and, b. total aromatics (per ASTM D-1319-84) not less than 21 percent by weight nor greater than 24.7 percent by weight.

4. A diesel fuel in accordance with claim 3 further chracterized by:

a. polycyclic aromatics (per ASTM D-2424-83) not greater than about 4.0 percent by weight;

b. sulfur content (per ASTM D-2622-82) not greater than about 42 parts per million by weight; and, c. nitrogen content (per ASTM D-4629-86) not greater than about 40 parts per million by weight.

* * * * *